United States Patent [19]
Reese

[11] 3,966,067
[45] June 29, 1976

[54] DISPOSAL VEHICLE

[75] Inventor: Raymond E. Reese, Los Angeles, Calif.

[73] Assignee: Frodsham, E. Dale, Yorba Linda, Calif.

[22] Filed: July 24, 1974

[21] Appl. No.: 491,199

[52] U.S. Cl. .............................. 214/302; 180/100; 187/9 R; 188/24; 244/75 R; 214/750; 308/3 B
[51] Int. Cl.[2] ......................................... B65F 3/02
[58] Field of Search ................. 293/38; 187/9 R, 20; 214/75 R, 85, 620, 621, 75 T, 302, 750; 308/3 B; 188/24; 180/100

[56] References Cited
UNITED STATES PATENTS

| | | |
|---|---|---|
| 2,456,434 | 12/1948 | Manthie .............................. 214/302 |
| 2,698,698 | 1/1955 | Smith et al. ......................... 214/750 |
| 2,798,621 | 7/1957 | Tracy ................................. 214/75 R |
| 2,843,280 | 7/1958 | Stopps ................................ 214/750 |
| 3,282,453 | 11/1966 | Wood ................................. 214/302 |
| 3,704,799 | 12/1972 | Morris, Jr. ........................... 187/9 R |
| 3,758,075 | 9/1973 | Briggs ................................ 214/750 |

Primary Examiner—Robert J. Spar
Assistant Examiner—Lawrence J. Oresky
Attorney, Agent, or Firm—J. Carroll Baisch

[57] ABSTRACT

The present invention relates to a disposal vehicle; and more particularly relates to improved disposal vehicle — preferably of the long truck or the trailer type. These, because of their structures, have a number of inherent advantages and have a number of inherent problems. The subject apparatus discloses some devices for use with these vehicles; and discloses other devices for use with various vehicles.

9 Claims, 8 Drawing Figures

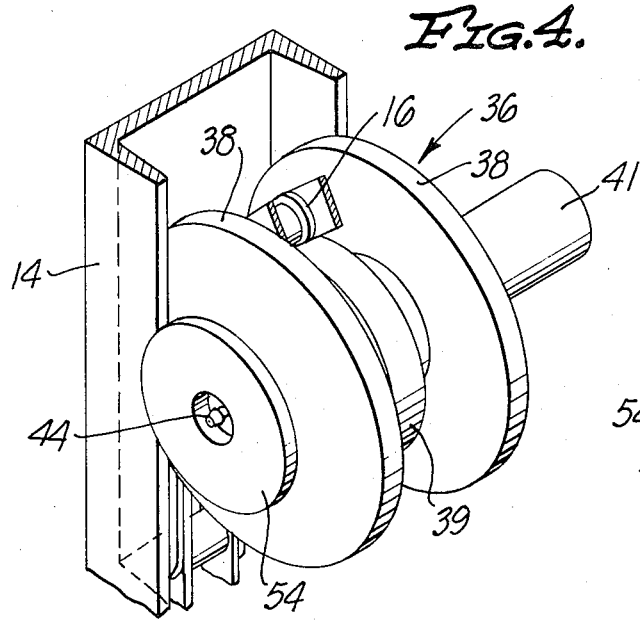
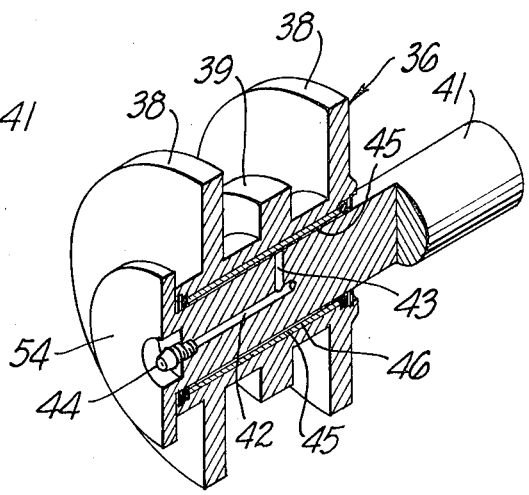
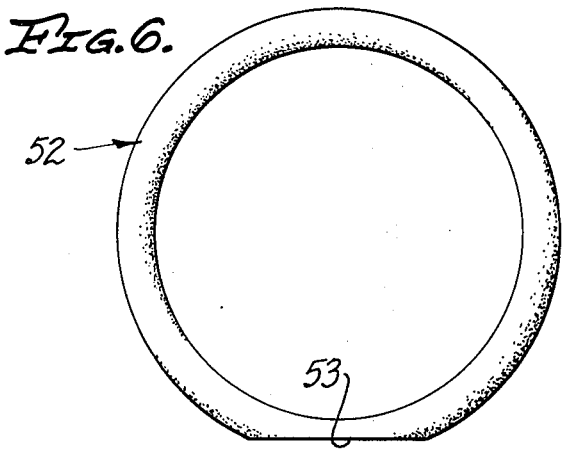
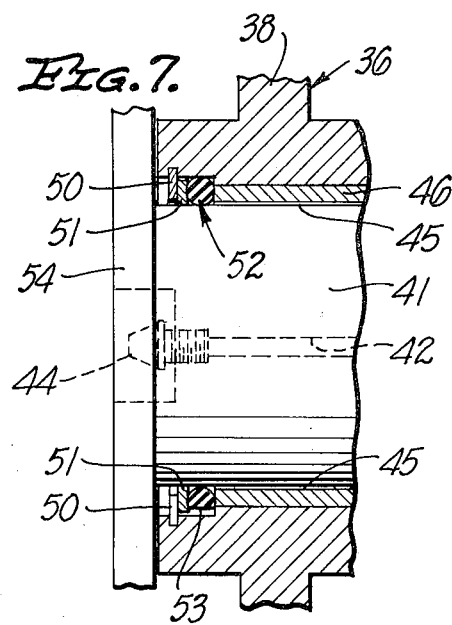
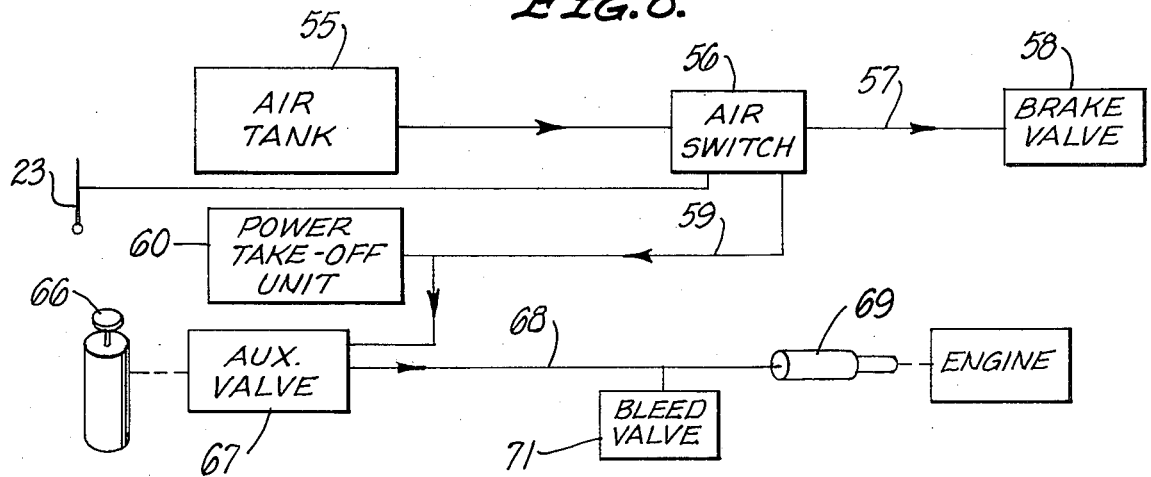

3,966,067

DISPOSAL VEHICLE

BACKGROUND

Most of the present day trash disposal systems use one or more local trash bins; and a trash disposal vehicle periodically dumps the contents of the trash bins into the trash vehicle for later remote disposal of the trash. The trash bins have taken many structural forms, but, at the present time, most of the trash bins are open topped structures that are mounted on wheels to permit limited mobility; and have brackets or channels that are adapted to receive the tines of a lifting fork associated with the disposal vehicle.

The disposal vehicle may be of the type that has its lifting fork at the front; but, this arrangement introduces various complications such as impaired visibility, moving the rear view mirrors, protecting the windshield, providing sighting devices, etc. Alternatively, the disposal vehicle may be of the type that has its lifting fork at the back thereof; and this arrangement has the advantage that it permits the use of long trucks and large capacity trailers.

For convenience, the rear loading type of disposal vehicles will be used in this presentation; although the term "truck" should be construed to include various types of vehicles; similarly, the term "trash" is to be construed to include garbage, the scrap of manufacturing processes, the residues associated with slaughtering, etc.

The specific operation is as follows:

The disposal truck is driven to the locale of the trash bin(s); the lifting fork tines of the truck are engaged with the channels of the trash bins; and a lifting mechanism of the vehicle raises the trash bin, positions it over the disposal vehicle, and tips it — thus dumping the contents of the trash bin into the disposal truck.

Various mechanisms have been introduced for raising and tipping the bin, covering and uncovering the truck, remotely activating the lifting mechanism, accelerating the engine to provide the power necessary for the bin lifting operating, etc., but, because of the very nature of the trash disposal system, many improvements are still desirable.

OBJECTIVES AND DRAWINGS

It is, therefore, the principal objective of the present invention to provide an improved disposal vehicle.

It is another objective of the present invention to provide apparatus for lifting and lowering barrels that are to be loaded onto or unloaded from a vehicle.

It is still another objective of the present invention to provide an improved lubricating apparatus.

It is a further objective of the present invention to provide an improved disposal vehicle that automatically locks the vehicle's brakes during the trash transfering operation.

It is a further objective of the present invention to provide an improved disposal vehicle that is pneumatically operated to automatically reduce the engine speed when power is not required.

The attainment of these objectives and others will be realized from a study of the following detailed description, taken in conjunction with the drawings of which:

FIG. 4 shows a view of a guide wheel and its environment;

FIG. 5 shows a cross sectional view of a lubrication means;

FIG. 6 shows a pictorial view of a modified sealing O-ring used in the lubricating means;

FIG. 7 shows the sealing assembly as used with the lubrication means;

FIG. 8 shows a block-and-schematic representation of the brake-locking and engine speed controlled arrangement.

SYNOPSIS

Broadly stated, the present invention is directed to a number of improvements for disposal vehicles. First of all, it discloses a modification that permits the loading and the unloading of barrels. Secondly, it discloses an improved means for lubricating bearings. Moreover, it discloses means for automatically locking the vehicle brakes to prevent inadvertent movement of the vehicle. And it also discloses improved means for permitting the vehicle engine to resume idling speed after being accelerated to provide lifting power.

INTRODUCTION

Figure 1:
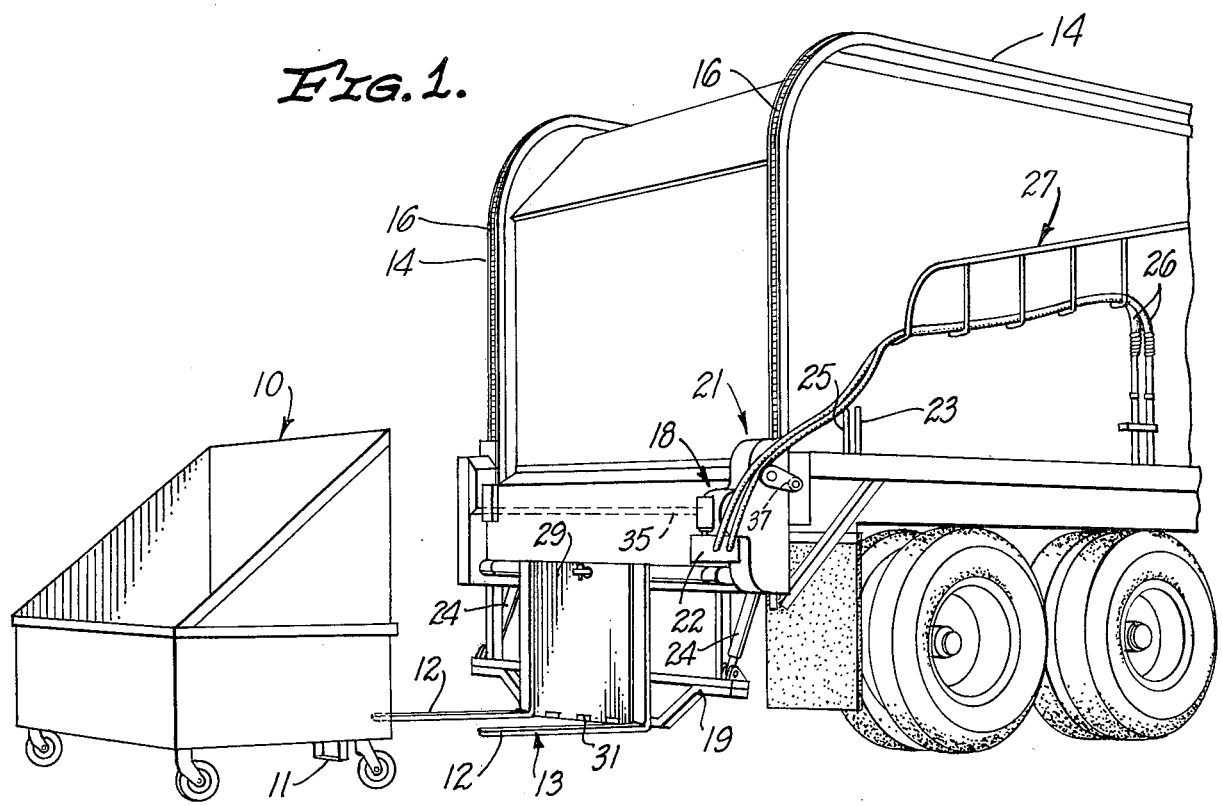
FIG. 1 shows a view of a trash bin, and a partial view of a disposal vehicle and some of its mechanisms.

As indicated above, most of the trash disposal trucks use a fork lift to engage the trash bins; and to raise and tip the trash bins — in order that the trash may be dumped into the truck. This dumping operation may be better understood from FIG. 1. This illustrates a wheeled trash bin 10 having a plurality of lifting brackets 11 that receive the tines 12 of the lifting fork 13.

The disposal truck incorporates a pair of channel like tracks 14 that extend upwards along the back of the truck, and extend horizontally in a longitudinal direction along the top of the truck. A sprocket chain 16 is positioned in each channel like track 14; the ends of the sprocket chains being anchored at the ends of the tracks 14. A lifting mechanism 18 comprises — in part — the lifting fork 13, a lifting framework 19, and a power mechanism 21 that incorporates a lifting motor 22.

The dumping operation proceeds as follows.

The trash bin 10 is moved until the tines 12 of the lifting fork 13 engage the lifting brackets 11. A suitable control 23, which is duplicated on the other side of the vehicle, actuates lifting motor 22; and — by means that will be discussed more fully later — the lifting mechanism 18 and the now engaged trash bin 10, climb up the vertical portion of the anchored sprocket chains 16, and move along the horizontal portion of the chains. The trash bin 10 is then tipped at a desired location, as by means of a hydraulic cylinder 24 and a second control 25.

In order to return the trash bin 10 to the ground, the second control 25 untips the trash bin to its upright orientation; and the first control 23 actuates the lifting motor 22 to rotate in the opposite direction. Under this condition, the lifting mechanism 18 and the now empty bin 10 descend the vertical portion of the sprocket chains 16; until the trash bin 10 rests on the ground.

Thus, when the lifting motor 22 is actuated by control 23, the lifting mechanism 18 moves along the tracks 14; the direction of movement being controlled by the direction of rotation of the lifting motor 22.

It has been found advantageous to use a hydraulic lifting motor 22; and hydraulic hoses 26 transmit the hydraulic fluid from a pressured hydraulic system to the hydraulic lifting motor 22. A storage rack 27 permits movement of the hydraulic hoses, and still assures that the hoses are always properly stored.

THE BARREL ACCESSORY

There are many times when it is necessary to transport barrels; but a great deal of difficulty has been experienced in the loading and unloading of these barrels from transporting vehicles. Usually, a crane or similar apparatus is required at each of the various locations; and the providing of such apparatus imposes a hardship on certain factories that use only a limited number of barrels.

It has been realized that the above described disposal truck may be readily modified to handle barrels; the modification comprising (a) the displacement of the back of the truck — as by physically moving it, by rolling it up in the manner of an accordian fold or a roll top desk etc., and (b) the use of a barrel accessory.

Figure 2:
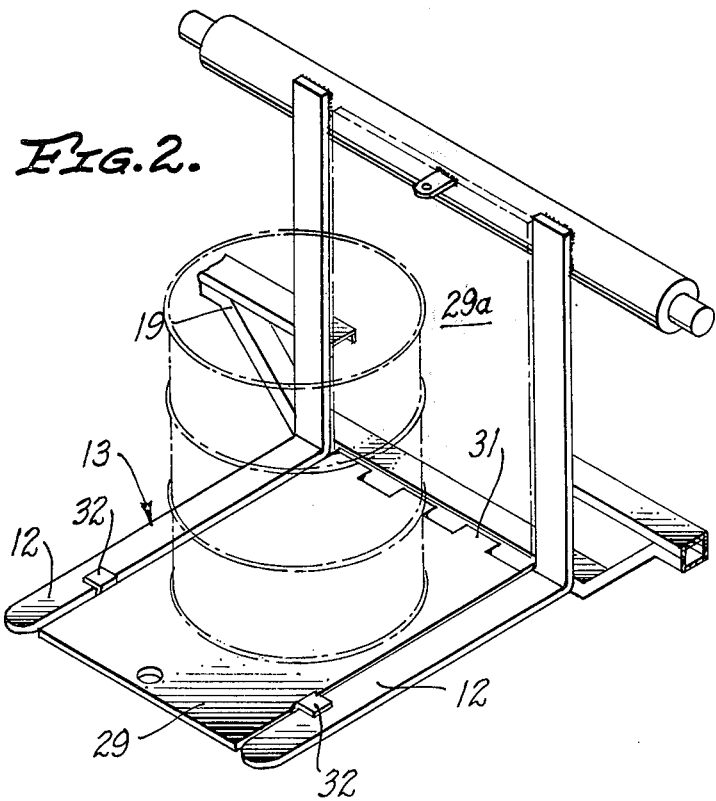
FIG. 2 shows a view of the barrel-lift modification, and its relation to the standard lifting fork.

The barrel-accessory is illustrated in FIG. 2 and is an adjunct to the lifting fork 13 described above. As shown, a barrel platform 29 is mounted on a hinge 31 positioned between the tines 12 of the lift fork 13; this distance accepting a standard sized barrel. A stop 32 is affixed, as by welding, to each edge of the barrel platform 29; each of the stops 32 resting on the upper surface of its respective fork tine 12, to place the barrel platform 29 in an operative position.

In this way, a barrel may be placed on the barrel platform 29, the lifting mechanism may be actuated in the above described manner; and the barrel may be lifted until its bottom is at the same level as the bed of the truck. Now the barrel may be rolled or pushed off the barrel platform 29, through the opening 29a, and placed in the truck.

For unloading the barrels, the above procedure is reversed; that is, the barrel is pushed from the truck onto the barrel platform, which is then lowered to ground level. For convenience, the term lifting and loading should be construed to include lowering and unloading respectively.

When the truck is to be used for disposal service, the barrel platform 29 is pivoted upwards on its hinge 31, as indicated by the dotted line representation; and is fastened in its operative position — as by a suitable pin. With the barrel platform 29 in its upright position, the lifting fork 13 is now able to function as described previously without interference from the lifting platform.

THE GUIDE WHEEL

In the past, a plurality of guiding sprocket wheels were used for guiding the lifting mechanism 18 along the sprocket chains 16. It has been found that these guiding sprocket wheels frequently introduced additional expense and problems such as jamming, spacing, chain stretching, shifts in position, etc.

Figure 3:
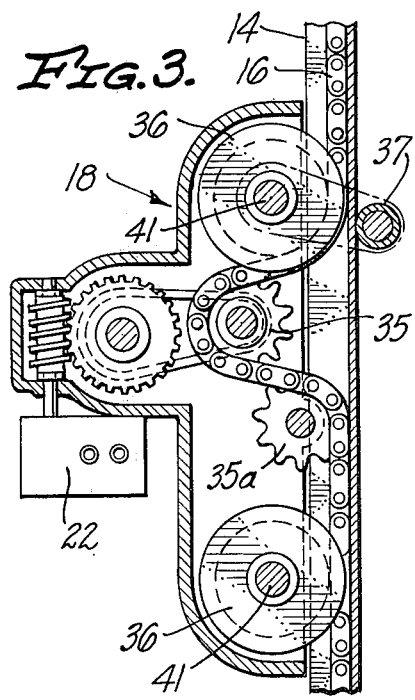
FIG. 3 shows a cross sectional view of part of the lifting mechanism.

Referring now to FIG. 3, this shows a partial cross sectional view of part of the lifting mechanism 18. As illustrated, the lifting motor 22 rotates a worm that engages a worm gear; this driving a drive chain that in turn rotates a driving sprocket wheel 35 that engages the sprocket chain 16.

FIG. 3 shows the lifting mechanism 18 to include two guide wheels 36 that replace the previously used guiding sprocket wheels; the present guide wheels 36 acting to avoid the above mentioned problem. Moreover, the upper guide wheel 36 and a small guide sprocket wheel 35a is spaced close to the driving sprocket wheel 35, in order that the sprocket chain 16 may engage the driving sprocket wheel 35 over as large a periphery as possible; the engaged periphery approaching 180°.

A snubbing roller 37 is used to maintain the lifting mechanism 18 adjacent to the track 14.

Referring back to FIG. 1, it will be noted that this shows only one driving motor 22; the shaft of the driving sprocket wheel 35 (of FIG. 3) extending across the vehicle, and being used to rotate a similar driving sprocket wheel on the other side of the vehicle. On those vehicles designed for heavier loads, a second driving motor may be used on the other side of the vehicle.

FIG. 4 shows a pictorial view of one such guide wheel 36. As illustrated, the guide wheel 36 has a pair of end flanges 38 that act to contain the sprocket chain 16; and further has a collar 39 that rides along the sprocket chain 16. The outer surfaces of the end flanges 38 of the guide wheel 36 are contained within the track 14 to assure that the driving mechanism remains in the tracks 14; this arrangement assuring the desired relation of the guide wheels 36, the tracks 14, and the chains 16.

GUIDE WHEEL LUBRICATION

As was pointed out above, lubrication can become a serious problem, because various types of trash tend to get into the moving parts; and usually cause unnecessarily large amounts of wear.

As indicated in the cut-a-way view of FIG. 5, the shaft 41 of the guide wheel 36 has a longitudinal bore 42 and a transverse interconnecting radial bore 43; the end of the longitudinal bore 42 being equipped with a lubricating fitting 44. Thus, a lubricant may be forced through the fitting 44, through the longitudinal bore 42, through the communicating radial bore 43, and into the lubricating area 45 between the outer surface of the shaft 41 and the inner surface of the bearing 46 of guide wheel 36.

It has been found that despite careful design and proper tolerances, the lubricating area 45 would not accept the desired amount of lubricant. Analysis has shown that air became trapped in the lubrication area; and prevented the entry of lubricant — despite the fact that the lubricating apparatus was apparently operating properly.

Applicant has been able to solve this lubrication problem by use of an O-ring 52 (see FIG. 6) that is ground-off slightly to produce one or more flat areas, as indicated at 53. When the O-ring 52 is thus prepared, the ground-off flat portion 53 acts as an air escape portion that permits the trapped air to escape; and the untouched portions of the O-ring 52 assure the necessary pressure and contact to provide containment of the lubricant.

The sealing assembly is shown in the partially cross sectional view of FIG. 7, wherein the guide wheel 36 is rotatably mounted on the shaft 41; flange 54 preventing the guide wheel 36 from coming off the shaft, and protecting the lubrication fitting. FIG. 7 shows the O-ring 52 positioned to seal the lubrication area 46; a spring washer 50 and a flat washer 51 being used to lock the sealing assembly in place, while applying the necessary sealing pressure between the O-ring 52 and the end of the sleeve bearing 46.

BRAKE LOCK

Most of the larger trucks and truck/trailer combinations use a pneumatic braking system of the "fail safe" type. That is, the brakes are applied by strong springs unless an air pressure is present to negate the spring action. In this way, any failure of the pneumatic system, any leakage of the air tubing etc., will cause the springs to automatically apply the brakes of the vehicle — thus producing a failsafe brake arrangement.

When the vehicle is to be driven, the operator sets a lever or other mechanism to a DRIVE setting; and an associated valve applies air pressure to the brake system, the air pressure negating the brake springs as discussed above — so that the brake system operates in its normal manner.

When the vehicle is to be parked, the operator sets the lever or other mechanism to a PARK setting; and the associated valve terminates the air pressure at the brake system (as by permitting the air to bleed away) — the brake springs applying the brakes as discussed above, so that the brakes are locked to prevent undesired vehicle movement.

FIG. 8 shows a simplified block-and-schematic diagram of suitable interconnections for such an overall system; but, it should be noted that other interconnections may be used to achieve the same results. In FIG. 8, a vehicle air tank 55 is kept full of pressurized air by means such as an air pump (not shown) that is operated driven by the vehicle's engine; and an associated air switch valve 56, at its DRIVE setting, applies air pressure through a brake line 57 to a brake valve 58 — to cause the brake system to operate in its normal manner. When the vehicle is to be parked, the air switch valve 56 is placed at its PARK setting; and it terminates the air pressure at the brake valve 58 — to cause the brake system to lock the brakes and prevent vehicle movement.

In accordance with the present invention, air switch 56 is additionally capable of controlling the air pressure applied through control line 59 to a power take-off unit 60 that provides power for the trash handling operation — as, for example, by driving suitable air pumps, hydraulic pumps, and/or the like. When the air switch 56 is set to its PARK setting, it terminates the air pressure to the brake valve 58, and locks the brakes — as discussed above; and, simultaneously, the air switch 56 applies air pressure to the power take-off unit 60. Here, the air-pressure places the power take-off unit 60 in an operative state — as by means of an air operated plunger or the like; so that the trash handling operations may be performed by the parked vehicle.

When the air switch 56 is set at its DRIVE setting, it applies air pressure to the brake valve 57 and releases the brakes — as discussed above; and simultaneously terminates the air pressure to the power take-off unit 60. Now, the terminated air pressure places the power take-off unit in an inoperative state, or — alternatively — places the trash handling portion thereof in an inoperative state; so that the trash handling operations cannot be performed.

It may be desirable for certain configurations of the vehicle, to interconnect the control lever 23 into the system in such a way that it is capable of achieving the same effect as placing the air switch 56 in the above-discussed PARK and DRIVE settings. Such an interconnection assures that the brakes of the vehicle are applied as soon as the control lever 23 is moved to activate the lifting mechanism.

In summary, when the air switch 56 is set to its PARK setting, the vehicle is immobilized, and the trash handling operations are suitably powered; and when the air switch is set to its DRIVE setting, the vehicle can move, but, the trash handling operations are not powered. Therefore, while the trash handling operations are being performed, the vehicle is immobilized; and while the vehicle is being driven along a street, the trash handling operations are disabled.

THE ENGINE SPEED CONTROL

When the disposal vehicle is parked, in order to dump the contents of a trash bin, the vehicle's engine normally assumes its idle setting. However, when a trash bin — or a barrel — is to be lifted, power is required to do this; and the vehicle's engine must be accelerated so the necessary power is available. Most prior art disposal vehicles were able to provide a mechanical linkage between the control lever arrangement and the vehicle's engine, for controlling the engine speed in order to provide the necessary power; but, when the disposal vehicle is very long, it takes the form of a trailer, it becomes impracticable to use a mechanical linkage.

Therefore, as indicated in FIG. 8, the control lever 23 has an auxiliary control — such as a thumb button 66 — that is electrically or mechanically linked to an auxiliary valve 67 that is capable of transmitting air pressure from control line 59 to an engine speed control line 68. This eventuates in an engine speed control device, such as an air cylinder 69, that is linked to the engine to control the speed thereof.

Thus, when the air switch 56 is at its PARK setting, and the control lever 23 is actuated, the operator's thumb simultaneously depresses the thumb button 66. This action activates auxiliary valve 67 and air cylinder 69 to accelerate the engine to a pre-set speed that provides the power necessary for the trash handling operation.

When the trash handling operation is completed, release of the thumb button 66 permits the discharge of pressurized air through a bleed valve 71; so that as the pressurized air escapes, the air cylinder 69 retracts to allow the engine to gradually assume its idle speed.

The DRIVE setting of air switch 56 automatically terminates the air pressure at auxiliary valve 67; and thus disables the engine acceleration feature.

SUMMARY

The present application discloses a number of improvements for disposal vehicles.

First of all, it discloses how a disposal vehicle may be modified for loading and unloading barrels, in addition to its usual function.

Second, it discloses an improved structure for lubricating wheel bearings.

It also teaches improved means for locking the vehicle's brakes against inadvertent movement of the vehicle.

Moreover, it teaches how a parked long truck or trailer may be adapted to have its engine resume idling speed after being accelerated.

I claim:

1. A dual-function vehicle-loading apparatus, comprising:
    a vehicle;

a lifting mechanism mounted on, and adapted to move relative to, said vehicle;
said lifting mechanism having:
a lifting framework;
a lifting fork having a pair of outwardly extending L-shaped pallet-type tines fixed to said lifting framework;
whereby said tines of said lifting fork may be engaged with respective lifting channels of a pallet-type structure on a container adapted to be lifted by said lifting mechanism, and have its contents dumped into said vehicle;
said lifting framework having a loading opening defined at the sides by the vertical legs of said tines and at the top and bottom by members of the lifting framework, said opening adapted to provide communication between the volume above said tines and the body of said vehicle when said lifting framework has been raised to a suitable level, a lifting platform adapted to fit onto said lifting framework adjacent said loading opening and extending between and co-planar with the vertical and horizontal legs of the pair of tines, respectively, when in the vertical or horizontal position; and cooperating means for holding said platform in an operative state relative to said lifting framework.

2. The invention of claim 1, including:
means for hingedly attaching one edge of said lifting platform to said lifting fork;
cooperative means for holding said lifting platform in an operative state on said tines;
whereby a load such as a barrel may be positioned on said lifting platform to be lifted;
locking means for holding said lifting platform in a hinged inoperative state relative to said tines;
whereby said tines are in an operative state to be used without interference from said lifting platform.

3. The invention of claim 1 including:
a sprocket chain having its ends anchored to said vehicle;
a guide wheel adapted to move along said anchored sprocket chain;
said guide wheel having a pair of end flanges;
the edges of said sprocket chain being contained by said end flanges of said guide wheels;
said guide wheels having a centered peripheral collar adapted to move along said sprocket chain.

4. The invention of claim 3, including:
means for lubricating said guide wheel;
said lubricating means comprising a shaft having a central bore and an interconnecting radial bore;
a lubricating fitting positioned in communication with said central bore of said shaft;
whereby a lubricant may be fed through said fitting, through said central bore, and through said radial bore to the surface of said shaft;
said guide wheel having a sleeve bearing therein;
said bearing being slightly spaced from said surface of said shaft to form a lubrication area that receives said lubricant;
a lubrication seal positioned at each end of said bearing;
said lubrication seal comprising an O-ring positioned around said shaft and between said shaft and said bearing;
said O-ring having at least one air escape portion adapted to permit the escape of air trapped in said lubrication area.

5. The invention of claim 4, wherein said air escape portion of said O-ring comprises a flattened area of said O-ring.

6. The invention of claim 1, including:
a brake system for said vehicle;
control means for controlling said brake system of said vehicle;
means for applying the brakes of said brake system;
means for releasing said brakes of said brake system;
means, actuated by said control means, for causing said applying means to apply said brakes of said vehicle;
means, actuated by said control means, for causing said releasing means to release the brakes of said vehicle;
whereby the brakes of said vehicle may be applied when said lifting mechanism is to be activated, and may be released when said lifting mechanism is to be deactivated.

7. The invention of claim 6 including:
power take-off means for providing power for said lifting mechanism;
said controlling means further being adapted to control said power take-off means.

8. The invention of claim 1 including:
control means for controlling said lifting-mechanism of said vehicle;
means for accelerating and decelerating the engine of said vehicle;
means, actuated by said control means, for causing said accelerating/decelerating means to accelerate said engine;
a bleed valve associated with said engine accelerating/decelerating means;
means, actuated by said control element means, for causing said bleed valve to decelerate said engine.

9. The invention comprising:
a disposal roadway truck;
a lifting mechanism mounted on, and adapted to move relative to, said truck;
said lifting mechanism having:
a lifting framework;
a lifting fork having a pair of outwardly extending pallet-type L-shaped tines fixed to said lifting framework;
whereby said tines of said lifting fork may be engaged with respective lifting channels of a pallet-type structure adapted to be lifted by said lifting mechanism;
said lifting framework having a loading opening defined at the sides by the vertical legs of said pair of tines, and at the top and bottom by members of the lifting framework, said opening adapted to provide communication between the volume above said tines and the body of said vehicle when said lifting framework has been raised to a suitable level,
a lifting platform adapted to fit between and to substantially fill the area between said pallet-type tines of said lifting fork;
means for hingedly attaching the rear of said lifting platform to said lifting framework;
cooperative means for holding said lifting platform in an operative state, the longitudinal edges of said lifting platform being supported by said tines;
whereby a load such as a barrel may be stably positioned on said lifting platform, to be lifted;
locking means for holding said lifting platform in an inoperative state relative to said tines;
whereby said tines are in an operative state to be used without interference from said lifting platform;
whereby said opening is approximately the same size as the platform and thus allowing a load to be pushed through said opening into said truck.

* * * * *